United States Patent [19]
Francis et al.

[11] Patent Number: 6,088,133
[45] Date of Patent: Jul. 11, 2000

[54] OPTICS FOR DOCUMENT SCANNER

[75] Inventors: James Thomas Francis, Merrimack; Howard Prescott Denton, Nashua, both of N.H.

[73] Assignee: Imaging Automation Inc., Bedford, N.H.

[21] Appl. No.: 08/856,100

[22] Filed: May 14, 1997

[51] Int. Cl.[7] .............................. H04N 1/04; G03B 27/70
[52] U.S. Cl. ..................... 358/473; 358/474; 358/497; 355/66
[58] Field of Search .................. 358/473, 474, 358/494, 497, 302; 355/21, 60, 64, 65, 66, 45, 22, 23, 24, 25

[56] References Cited

U.S. PATENT DOCUMENTS

| | | | |
|---|---|---|---|
| 4,145,138 | 3/1979 | Mercure | 355/25 |
| 4,626,925 | 12/1986 | Toyoda | 358/473 |
| 4,701,039 | 10/1987 | Johnson | 355/21 |
| 5,687,007 | 11/1997 | Yamazaki et al. | 358/474 |
| 5,748,338 | 5/1998 | Lee | 358/473 |

*Primary Examiner*—Alan A. Mathews
*Attorney, Agent, or Firm*—Joseph E. Funk

[57] ABSTRACT

Optics for a document scanner are disclosed which permit information on a document to be optically reorganized so they may be input as a single image to the lens of a single charge coupled device camera without the need for moving optics or moving document arrangements to sequentially image portions of the document to the input lens of the camera. The optics are mirrors in a fixed, stationary arrangement with respect to each other, between the camera lens and a document to be read. All the information to be read on the document is reflected between the mirrors and is thereby transposed physically before being input to the lens of the camera as a single image. After the single image input to the camera is scanned and stored the image portions are re-transposed using a computer and software utilizing a transposition algorithm to re-create the information on the document in their proper order. The single image may also be passed through optical filters to delete portions of the image before it is input to the lens of the camera so that the camera can only scan certain portions of the image having predetermined colors.

13 Claims, 3 Drawing Sheets

FIG. 3A

USA<DOE<JOHN
<75316USA8<3

FIG. 3

OPTICS FOR DOCUMENT SCANNER

FIELD OF THE INVENTION

This invention relates to scanners used to scan information on documents such as, but not limited to, passports, credit cards, alien registration cards, INS frequent traveler passcards, drivers license and other types of documents. More particularly, this invention relates to the optics used in such scanners.

BACKGROUND OF THE INVENTION

In the prior art there has long been a need to scan documents to create images that are used by copiers in the reproduction process, and by scanners and optical character readers to create an electronic file of the scanned picture or document.

When the width of a picture or document to be scanned is wider than the field of view of a camera, such as a charge coupled device (CCD) video camera, in the scanner something must be done to scan the whole document. One prior art technique has been to utilize two cameras mounted side by side and the video output from the two cameras is electronically joined together, while eliminating duplicity caused by overlapping scan fields of the two cameras.

Another prior art technique has been to use a mirror or prism arrangement that is mechanically rotated or oscillated to receive the image of an entire scanned picture or document and sequentially reflect it into the lens of a single camera. Such mechanical arrangements must be carefully aligned and due to mechanical wear must be periodically realigned and repaired.

Thus, there is a need in the art for an optical arrangement not having moving parts that can be used to input the image of a picture and/or text document that is wider than the field of view of a single camera to a document scanner.

SUMMARY OF THE INVENTION

The above stated need of the prior art is met by the present invention in which a single charge coupled device (CCD) camera is used to image information on a document, where the information has a physical width greater than the field of view of the camera. Neither the camera nor the picture and/or the text containing document are moved to capture the entire width of the document, and no rotating, oscillating or otherwise moving optical system is used to provide the document image to the camera. Rather, an optical arrangement comprised of fixed mirrors is used to provide an image of all picture and/or text information on a document positioned under the mirrors. The reflected image from the document is transposed using the mirrors to create a new image that includes all the document information, but the new image fits within the field of view of the camera. There are no moving parts in the novel optical system. The video output from the CCD camera is stored and processed to re-transpose the image(s) to recreate the images in their original forms as text and/or picture files. Files containing text images may be read using optical character reader technology to create a file having the text information in ASCII or other format. In this manner all the information printed on the wide document is imaged at one time to the single electronic camera, and not in a sequential manner as accomplished with scanners and readers having moving elements. In addition, colored filters and different frequency light sources may also be used so that only images of particular portions of a document are input to the camera.

DESCRIPTION OF THE DRAWING

The invention will be better understood upon reading the following Detailed Description in conjunction with the drawing in which:

FIG. 3 is a more detailed representation of alpha-numeric information on a passport; and FIG. 3A shows how the alpha-numeric information on a passport is transposed to create a new image that is within the field of view of the CCD camera to be imaged, read, and processed.

DETAILED DESCRIPTION OF THE INVENTION

In the following detailed description is disclosed one embodiment of our invention in a passport reader for reading alpha-numeric text information printed on a passport, and using such information for many purposes such as checking against a data base of individuals denied entry or exit from a country. The passport reader has a slot into which is inserted the front cover of an opened passport with the identification information on the inside of the front cover showing in order to be read. More particularly, printed on the inside of the front cover are located a few lines of alpha-numeric information oriented parallel to the vertical edge of the cover. It is this information that is read by the passport reader which utilizes the subject invention. While not described herein other fields of text and the photograph in a passport can be scanned using the teaching of the present invention.

Figure 1:
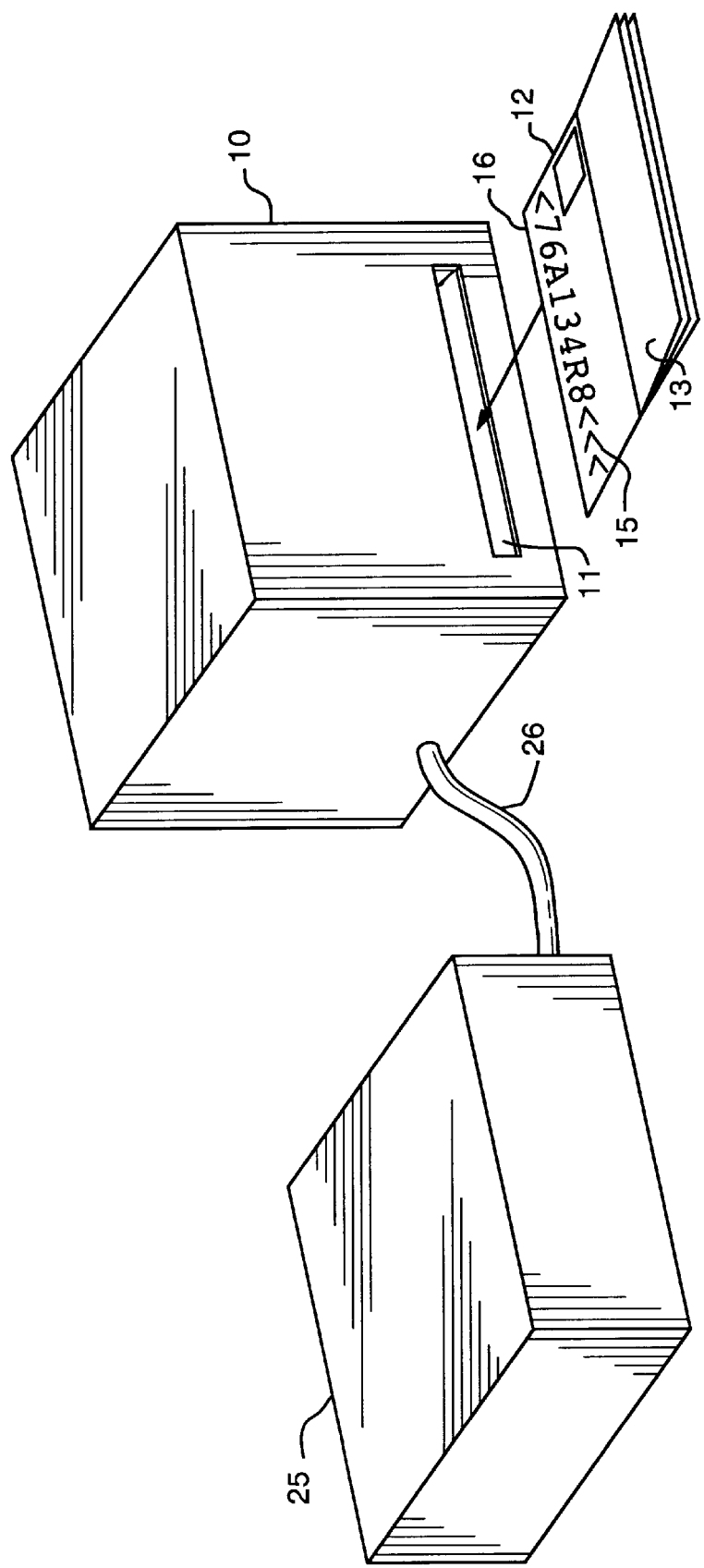
FIG. 1 is a block diagram of a passport reader having a slot into which an open passport is inserted to read information imprinted thereon.

A passport reader 10 utilizing the invention is generally shown in FIG. 1. On its front is a horizontal slot 11 into which only the front cover 12 of passport 13 is inserted with alpha-numeric information 15 on the inside of cover 12 facing upward. The edge 16 of cover 12 can only be inserted a pre-determined distance into slot 11 as set by a stop (not shown) at which point it triggers a detector (also not shown). At this inserted position information 15 oriented parallel to the edge 16 of the cover is fully positioned inside passport reader 10 where it can be read.

When the detector is triggered a bank of light emitting diodes (LEDs) (not shown) are energized to illuminate the alpha-numeric information 15 imprinted on the edge 16 of the inside of the front cover 12 of passport 13. While only one row of representative information 15 is shown on passport cover 12 in FIG. 1, there is in actuality more than one row of information imprinted thereon.

The stop, switch and LEDs are not shown, but one skilled in the art will readily know how to implement a stop with a switch that is actuated when the front cover 12 of passport 13 is inserted a predetermined distance into slot 11 of passport reader 10. Also, one skilled in the art will readily know how to assemble a row of light emitting diodes inside reader 10 and parallel to edge 16 of the front cover 12 of passport 13, and how to energize the LEDs when the switch is operated. These elements that are not shown are described for completeness but do not comprise part of the invention which are the optics (shown in FIG. 2) that focus an image 14 of information 15 into the lens of a camera 20 (shown in FIG. 2).

Passport reader 10 is connected to a computer 25 via a cable 26. Image 14 (see FIG. 2) of information 15 imaged using passport reader 10 is transferred to computer 25 for image processing and optical character reading as described further in this detailed description. Computer 25 may be a personal computer or may be a custom built computer used only with passport reader 10.

Figure 2:
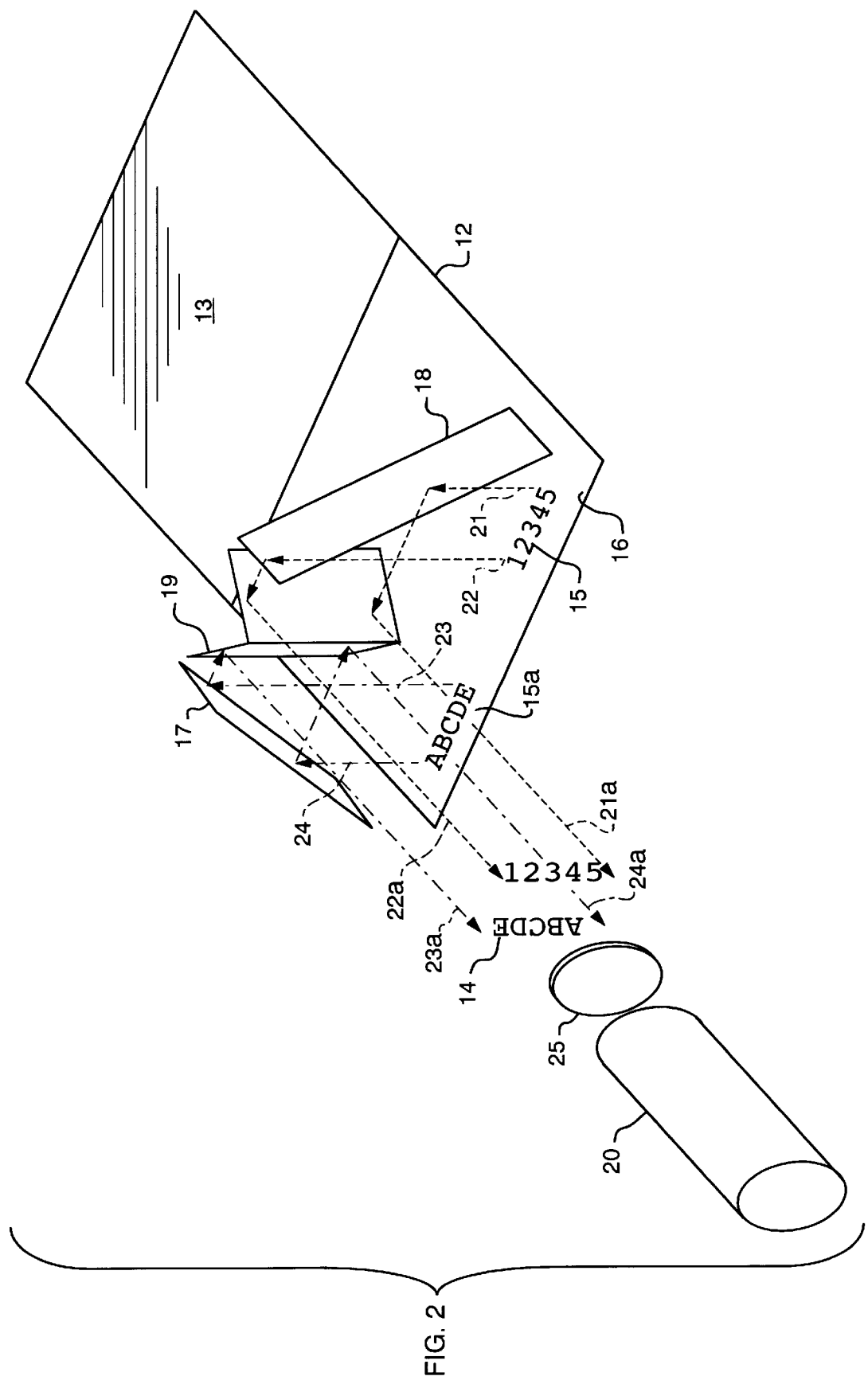
FIG. 2 is a detailed representation of the novel optics used in the passport reader in accordance with the preferred embodiment of the invention.

In FIG. 2 is shown the novel optics of the present invention. They comprise planar mirrors 17 and 18, and v-shaped mirror 19 oriented as shown with respect to alpha-numeric information 15 and 15A on the inside of front cover 12 of passport 13. The LEDs, stop, and switch are not shown because they would clutter FIG. 2 and obscure the novel optics.

Planar mirrors 17 and 18 are each oriented at an angle of forty-five degrees with respect to the horizontal plane in which cover 12 of passport 13 lies. Thus, mirrors 17 and 18 are perpendicular to each other, although they do not touch each other. The reflecting surfaces of mirrors 17 and 18 each face angularly downward toward passport 13. The edge of mirrors 17 and 18 closest to cover 12 extend slightly beyond the extremes of information 15 and 15A. V-shaped mirror 19 is comprised of two mirrors that are oriented at a right angle to each other, while at the same time being perpendicular to the plane in which lies cover 12 of passport 13. The reflecting surfaces of mirror 19 face toward mirrors 17 and 18.

Information 15 and 15A are exemplary of the information normally imprinted on the inside of cover 12 of passport 13 parallel to edge 16. While the information usually extends contiguously and uniformly along the entire edge 16 in a few rows, for ease of presentation and understanding of the invention only the exemplary, spaced, alpha-numeric characters A–E and 1–5 are shown.

Light from the LEDs, not shown, reflects from the inside of cover 12 of passport 13, and more particularly from the portion thereof on which is printed information 15 and 15A. The reflection creates an image that is reflected via mirrors 17, 18 and 19 into the lens of charge coupled device (CCD) camera 20. CCD cameras are well known in the art and are not discussed in any detail here.

In lieu of the infrared light emitting diodes used in the document scanner disclosed herein, other types of monochromatic and polychromatic light sources may also be used, in and out of the visible light range. These light sources of different wavelengths may be switched while scanning a single document. Coupled with the use of different light filters 25 that pass or reject light of different wavelengths and are positioned in front of the input lens of CCD camera 20 to pass only colored light reflected from specific portions of passport 13 or other types of documents being scanned, information printed in different colors on a document may selectively be input to camera 20 and scanned at different times. In this manner, for example, our novel scanner may be used to scan information on document 13 that is in different colors or invisible to the human eye, but is made visible under ultraviolet light.

Light reflected from the inside of cover 12 of passport 13 is represented by light rays shown as dotted lines in FIG. 2. While light rays will actually be reflected at different angles from the inside of cover 12, only lights rays reflected vertically from cover 12 are shown to avoid confusion in the drawing. In addition, as understood in the optics art, reflections off mirrors cause image inversions and reversals which are not shown here for simplicity of presentation.

Starting with the alpha-numeric character "5" of information 15, light ray 21 is shown reflecting vertically from the inside of cover 12 and impinging on the mirrored surface of mirror 18. Ray 21 is incident on mirror 18 at an angle of forty-five degrees and reflects therefrom at an angle of forty-five degrees toward mirror 19. Ray 21 is then incident on mirror 19 at an angle of forty-five degrees and reflects therefrom at an angle of forty-five degrees toward camera 20. This is shown as light ray 21A creating an image of the number "5" of the overall image 14 at the input lens (not shown) of CCD camera 20.

For the alpha-numeric character "1" of information 15, light ray 22 is shown reflecting vertically from the inside of cover 12 and impinging on the mirrored surface of mirror 18. Ray 22 is incident on mirror 18 at an angle of forty-five degrees and reflects therefrom at an angle of forty-five degrees toward mirror 19. Ray 22 is then incident on mirror 19 at an angle of forty-five degrees and reflects therefrom at an angle of forty-five degrees toward camera 20. This is shown as light ray 22A creating an image of the character "1" of the overall image 14 at the input lens (not shown) of CCD camera 20.

For the alpha-numeric character "E" of information 15A, light ray 23 is shown reflecting vertically from the inside of cover 12 and impinging on the mirrored surface of mirror 17. Ray 23 is incident on mirror 17 at an angle of forty-five degrees and reflects therefrom at an angle of forty-five degrees toward mirror 19. Ray 23 is then incident on mirror 19 at an angle of forty-five degrees and reflects therefrom at an angle of forty-five degrees. This is shown as light ray 23A creating an image of the character "E" of the overall image 14 at the input lens (not shown) of CCD camera 20.

Finally, for the alpha-numeric character "A" of information 15A, light ray 24 is shown reflecting vertically from the inside of cover 12 and impinging on the mirrored surface of mirror 17. Ray 24 is incident on mirror 17 at an angle of forty-five degrees and reflects therefrom at an angle of forty-five degrees toward mirror 19. Ray 24 is then incident on mirror 19 at an angle of forty-five degrees and reflects therefrom at an angle of forty-five degrees. This is shown as light ray 24A creating an image of the character "A" of the overall image 14 at the input lens (not shown) of CCD camera 20.

Other light rays, not shown, will reflect from the inside of cover 12 at all angles other than perpendicular. Some rays will not impinge on mirrors 17 and 18 and be reflected therefrom, but other rays will impinge on mirrors 17 and 18 and be reflected therefrom, and from mirror 19 to form the overall image 14 at the input lens (not shown) of CCD camera 20.

Thus, as is seen in FIG. 2, although alpha-numeric characters A–E and 1–5 are in a row on the inside of cover 12 of passport 13, after reflection through the mirrors they are transposed to form image 14 having two columns side by side at the input lens (not shown) of CCD camera 20. Without the use of mirrors 17, 18 and 19 the image of alpha-numeric information 15 and 15A could not all be focused at the same time on the input lens of CCD camera 20. As previously pointed out, reflections off mirrors cause image reversals and inversions which are shown. The reversals and inversions are always in the same location and the software that processes the image output from the CCD camera 20 processes the images to rotate and invert them, and to put them in the same physical orientation as on the passport.

All light rays reflecting from the three or four continuous rows of alpha-numeric characters actually along the edge 16 of front cover 12 of a passport 13 (but not shown) and via mirrors 17, 18 and 19 will create the columnar image 14 of all these characters as described in the previous paragraphs at the input lens (not shown) of CCD camera 20.

In FIG. 3 is shown a more detailed example of the alpha-numeric character transposition of two rows of alpha-numeric characters along edge 16 of the inside of cover 12 of passport 13. After their image is reflected through mirrors 17, 18 and 19 the resultant image 14 at the input lens of CCD camera 20 is as shown in FIG. 3A. The original two rows of alpha-numeric characters were too wide to fit within the field of view of CCD camera 20, but after being reflected through mirrors 17, 18 and 19 and transposed to form the image in FIG. 3A, they all fit within the field of view of CCD camera 20. As previously pointed out, reflections off mirrors cause image reversals and inversions which are as shown in FIG. 3A. The reversals and inversions are always in the same location and the software that processes the image output from the CCD camera 20 rotates and inverts the characters to put them in the same physical orientation they have on the passport.

The image shown in FIG. 3A is stored in memory, and in a manner well known in the art, the image is processed by a processor (shown in FIG. 1) under control of software to re-transpose, re-invert and re-reverse the alpha-numeric characters back to the orientation shown in FIG. 3. This is an easy task for one skilled in the art using a transposition algorithm and other image processing software known in the art. For alpha-numeric information, optical character reading (OCR) software is then used to read the alpha-numeric characters and store them in ASCII code in a file. The image does not have to be immediately processed as described herein, but may be stored to be processed at a later date.

The mirrors 17, 18 and 19 may alternatively be positioned during assembly so that one or more characters, such as the "O" and "E" in "DOE" in line 1 of FIG. 3, and the "6" and "U" in line 2 of FIG. 3 are repeated in the columns in FIG. 3A to assure that no characters are lost even when the characters printed on the passport are not exactly in the same position on all passports. After re-transpositions and re-orientation of the characters by the software the repeated characters are deleted. This is easy to accomplish because the repeated characters are always in the same position.

The ASCII code transposed to be in the order shown in FIG. 3 may then be processed in many different ways as known in the art. For examples, the information may be stored as a permanent or semi-permanent record indicating the particular passport was read by a particular passport reader at a particular location indicating the carrier of the passport passed through that location, or it may be compared to other information stored in a data base to determine if the carrier of the passport is wanted by the authorities for any reason, or is to be denied ingress or egress.

A document being scanned, such as passport 13 shown in FIG. 1, may have alpha-numeric text and images or other pictures. These images or pictures may be scanned at the same time that the alphanumeric text is scanned. When the alphanumeric text and the images or pictures are in fixed positions, as they are in a passport and other types of identity documents, the computer knows which stored scan information represents text and which represents images or pictures and can process each type of information accordingly.

While what has been described herein is an embodiment of the invention as a passport reader reading alpha-numeric text, it will be understood by those skilled in the art that numerous changes may be made without departing from the spirit and scope of the invention. First, all kinds of documents having alpha-numeric information may be imaged using the teaching of our information and then "read" using OCR technology. For a reader that can handle documents that are larger than a passport, the optics described herein may be made physically larger, or two parallel sets of optics may be used and the images from each may be "stitched" together with software to form the electronic representation of the image of the larger document.

Also, pictures or images that are not alpha-numeric text may also be imaged, digitized and stored using our novel optical imager. The digitized pieces of the pictures or images are then processed using special software to reposition the pieces and "stitch" them together to recreate the original picture or image which is then stored. This technology already exists. Hand held scanners are well known in the art and are used to scan images as several scanned portions which are then "stitched" together to form the complete original picture.

Further, a lens or lenses may interposed in the light path between mirror 19 and the lens of camera 20 to focus the transposed image to a smaller size at the input to the CCD camera when the CCD camera has a very high scan resolution. In this manner larger documents having more information thereon may be imaged to the CCD camera and processed.

What is claimed is:

1. Optics for a document scanner providing an optical path between a document to be scanned and a camera, said optics comprising:
    a first plurality of mirrors mounted in a fixed manner above a document to be scanned to reflect an image of said document;
    a second plurality of mirrors mounted in a fixed manner to receive said document image reflected from said first plurality of mirrors, said second plurality of mirrors reflecting said document image from said first plurality of mirrors in a manner to create a new image at the input of said camera that is a transposed form of the document image reflected from said first plurality of mirrors.

2. The invention in accordance with claim 1 wherein said first plurality of mirrors comprises a third mirror and a fourth mirror each having a reflective surface, with said third and fourth mirrors being perpendicular to each other and each being at a forty-five degree angle with respect to said document, and the reflective surface of said third and fourth mirrors faces toward said document and each reflects a portion of said image of said document.

3. The invention in accordance with claim 2 wherein said second plurality of mirrors comprises a fifth mirror and a sixth mirror each having a reflective surface, with said fifth and sixth mirrors being perpendicular to each other and being perpendicular to said document, the reflective surface of said fifth mirror facing toward the reflective surface of said third mirror, the reflective surface of said sixth mirror facing toward the reflective surface of said fourth mirror, and the portions of said document image reflected from said third and fourth mirrors is reflected respectively from said fifth and sixth mirrors to create said transposed form of the document image at the input of said camera.

4. The invention in accordance with claim 3 wherein third and fourth mirrors touch each other and form a line of intersection that is perpendicular to said document, said third and fourth mirrors thus creating a V that points towards said camera.

5. The invention in accordance with claim 1 further comprising a filter disposed in the optical path between said document and said camera for passing or rejecting specific wavelengths of light reflected from said document being scanned.

6. The invention in accordance with claim 4 further comprising a filter disposed in the optical path between said document and said camera for passing or rejecting specific wavelengths of light reflected from said document being scanned.

7. Optics for a document scanner to provide an optical path between information on a document to be scanned and a camera, where the field of view of the camera is not wide enough to image all the information on the document, and said optics reorganizes said information so it is in the field of view of said camera, said optics comprising:

a first mirror and a second mirror each having a reflective surface, with said first and second mirrors being at an angle with respect to each other and at an angle with respect to said document, the reflective surface of said first and second mirrors faces toward said document, said first mirror reflects a first portion of said image of said document, and said second mirror reflects a second portion of said image of said document, a third and a fourth mirror each having a reflective surface, with said third and fourth mirrors being perpendicular to each other and being perpendicular to said document, the reflective surface of said third mirror facing toward the reflective surface of said first mirror to reflect said first portion of said document image from said first mirror toward the input of said camera, and the reflective surface of said fourth mirror facing toward the reflective surface of said second mirror to reflect said second portion of said document image from said second mirror toward the input of said camera, and said first portion and said second portion of said document image are transposed by said first, second, third and fourth mirrors to create a new image that is in the field of view of said camera.

8. The invention in accordance with claim 7 further comprising a filter disposed in the optical path between said document and said camera for passing or rejecting specific wavelengths of light reflected from said document being scanned.

9. The invention in accordance with claim 8 wherein third and fourth mirrors touch each other and form a line of intersection that is perpendicular to said document, said third and fourth mirrors thus creating a V that points towards said camera.

10. A method for creating an image of information on a document that can then be scanned by a camera, said method comprising the steps of:

creating a first image of a first portion of said information on said document, creating a second image of a second portion of said information on said document, transposing said first and said second images to create a third image that is scanned by said camera, and storing said scanned third image.

11. The method in accordance with claim 10 further comprising the step of re-transposing said third image to reconstruct said first and said second portions of said information in the same order as they have on said document.

12. The method in accordance with claim 10 further comprising the step of optically filtering said first and said second images before they are scanned by said camera so that said camera can only scan specific portions of said document image.

13. The method in accordance with claim 10 further comprising the step of optically filtering said third image before it is scanned by said camera so that said camera can only scan specific portions of said document image.

* * * * *